United States Patent Office 3,120,846
Patented Feb. 11, 1964

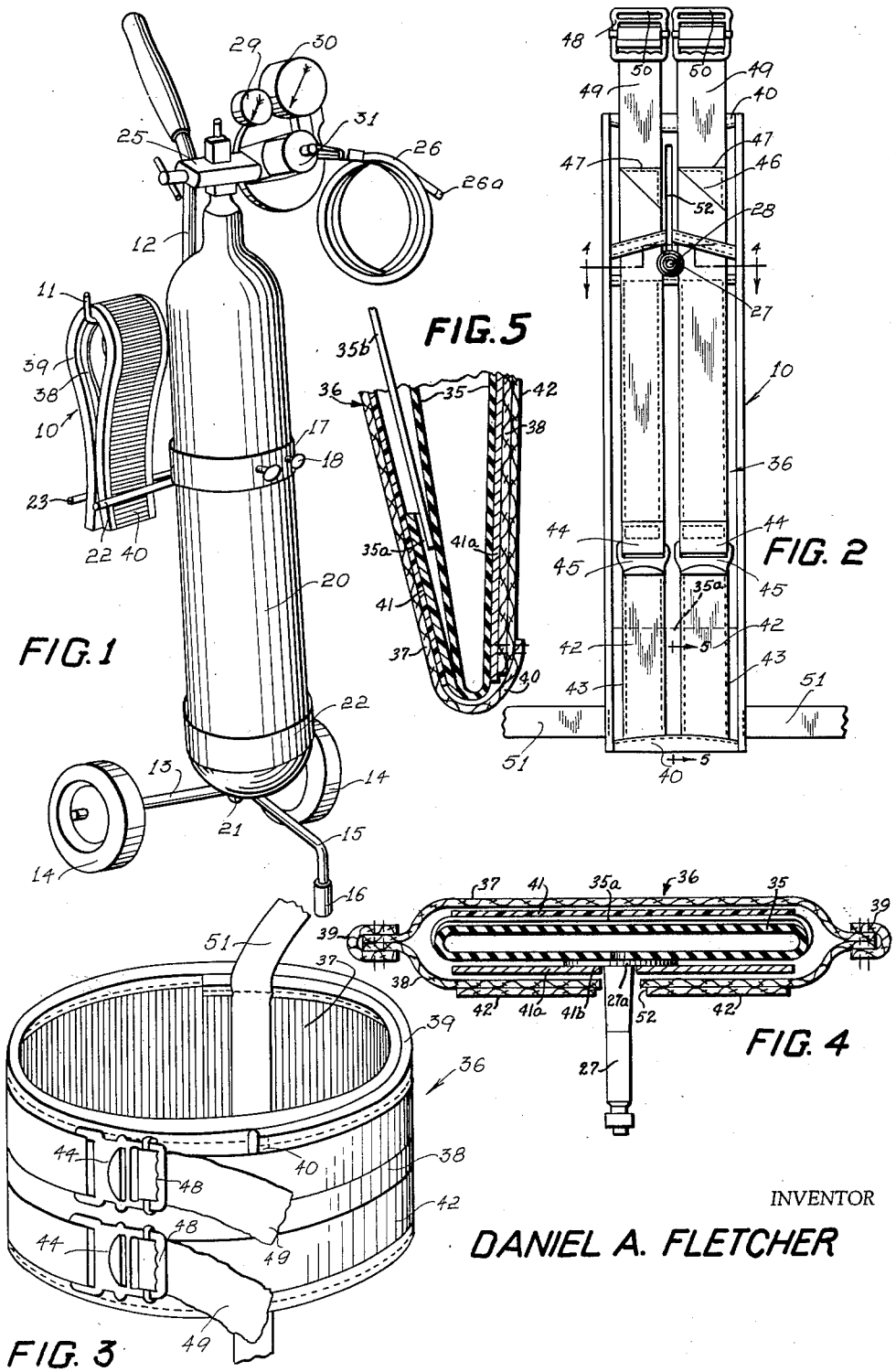

3,120,846
PNEUMATIC TOURNIQUET
Daniel A. Fletcher, 800 Dale Drive, Silver Spring, Md.
Filed Sept. 12, 1962, Ser. No. 223,138
7 Claims. (Cl. 128—327)

This invention relates to a pneumatic tourniquet, and has as its primary object the provision of an improved tourniquet of this character for restriction of the flow of blood to the extremities or producing hemostasis during surgery, although the tourniquet of the instant invention may also be advantageously employed with a sphygmomanometer apparatus.

A primary object of the invention is the provision of a pneumatic tourniquet of this character and associated apparatus by means of which the pressure in the tourniquet may be positively and precisely controlled with a minimum of effort and difficulty.

A further object of the invention is the provision of a tourniquet of this character which may be readily and expeditiously applied to an extremity and equally expeditiously removed therefrom when desired or necessary.

A further object of the invention is the provision of an improved tourniquet characterized by an inflatable expansible rubber bag, together with means for applying air under pressure thereto, the tourniquet or cuff being contained in an external reinforcing and expansion controlling sleeve, the latter being provided with quick detachable and attachable buckles whereby the tourniquet may be applied or removed in a minimum of time.

A more specific object of the invention relates to the particular construction of the external cuff, the reinforcing means associated therewith, and the means therein for retaining the expansible resilient bladder securely in position therein, such means being characterized by improved retention means which positively preclude the twisting or disalignment of the internal expansible tourniquet.

Still another object of the invention resides in the provision of a cuff on the distal end of the internal bladder into which a stiff object, such as a ruler, may be inserted to facilitate the insertion of the bladder into the external cuff.

Still other objects reside in the combinations of elements, arrangements of parts, and features of construction, all as will be more fully pointed out hereinafter and disclosed in the accompanying drawing wherein there is shown a preferred embodiment of the instant inventive concept.

In the drawing:

FIGURE 1 is a perspective view, parts thereof being omitted, of a tourniquet constructed in accordance with the instant invention shown as mounted on a mobile stand which carries a pressurized tank of compressed air or the like for the immediate inflation of the tourniquet together with associated gauges.

FIG. 2 is a plan view of the tourniquet of the instant invention as viewed from its outer side, parts thereof being broken away.

FIG. 3 is a perspective view of the tourniquet shown in operative position.

FIG. 4 is an enlarged fragmentary sectional view taken substantially along the line 4—4 of FIG. 2 as viewed in the direction indicated by the arrows, and FIG. 5 is an enlarged fragmentary sectional view taken substantially along the line 5—5 of FIG. 2.

Similar reference characters refer to similar parts throughout the several views of the drawing.

Having reference now to the drawing in detail, the tourniquet of the instant invention is generally indicated at 10 and when not in use is adapted to be supported by an elongated hook 11 carried by a mobile supporting frame having an upright 12. The lower portion of upright 12 is secured to an axle 13 which mounts on its opposite ends rubber tired wheels 14. A supporting leg 15 carrying a rubber cushioned tip 16 is also provided.

A separable strap 17 provided with fastening screws 18 is also secured to the upright 12 and is adapted to retain a tank 20 of compressed air or similar fluid under pressure in position on a base 21, a lower securing strap 22 also being provided.

A pair of extending arms 23 extend from the side of support 12 below the hook 11 and serve to retain the ends of the cuff in related assembly when not in use.

Upright 12 is provided at its upper extremity with a fitting 25 which contains a valve (not shown) fitting over the top or outlet of tank 20, the valve being regulated in any desired manner and provided with a conduit which extends through a flexible tube 26 which is adapted to be attached to a tubular connector 27 of the tourniquet. Connector 27 includes a concentric metal tube 28 which normally permits the flow of air in either direction into or out of the bladder of the tourniquet. The fitting 25 carries the usual tourniquet pressure gauge 29 and tank pressure gauge 30, as well as the other standard fittings, and is provided with the usual regulator 31 for fingertip control, including means whereby the fluid pressure may be controlled manually or automatically.

Referring now to the cuff or tourniquet of the instant invention, the same is comprised of a double walled bladder 35 which is made of expansible material, such as rubber or the like, and which is supplied with air under pressure through the connector 27. Connector 27 is secured to the bladder by means of a reinforcing patch 27a. The bladder 35 is contained within an outer sleeve or cuff which is generally indicated at 36, and which comprises an inner sheet or side 37 which is comprised of stretchable fabric and which in turn is secured to an outer annular sheet of non-stretchable fabric 38, the securing means taking the form of longitudinally extending relatively heavy longitudinally folded bands 39 which are stitched to the fabric along the edges. The stretchable fabric 37 is secured or stitched to bands 39 while under both longitudinal and transverse tension and by virtue of the continuously maintained tension substantially precludes the formation of folds, ridges or wrinkles on the inner surface of the tourniquet regardless of the diameter of the limb to which it is applied. Since the stretchable fabric is held under tension and expanded by its connection through bands 39 to nonstretchable fabric 38 when the cuff is not in use, tightening of the cuff about a limb will permit the stretched fabric to contract towards its untensioned condition when first applied to the curvature of the limb without wrinkling or folding, and expand smoothly when the tourniquet is inflated. The stretchable knit fabric also absorbs perspiration in the area to which it is applied.

The opposite ends of stretchable fabric portion 37 are inwardly turned as at 40 and extend over the ends of the inner cloth portion 38 and are secured thereto. The outer or inelastic side 38 of sleeve 36 is provided with an elongated slot 52 through which bladder 35 may be inserted.

The distal or remote end of bladder 35 on the side opposite connector 27 has secured thereto by vulcanizing or the like a strip of rubber 35 forming a pocket which is open at its upper end, into which the end of a ruler 35b or other flat rigid object may be inserted prior to the insertion of bladder 35 into sleeve 36 through slot 52 (see FIG. 5) to facilitate the insertion of the distal end of the bladder 35 into the outer sleeve or cuff 36 whenever replacement or renewal is necessary or desirable. Flat semi-flexible strips 41 and 41a extending substantially the full length of sleeve 36 are inserted through slots 52 and positioned one on either side of bladder 35 between the bladder and the inner sides of the sleeve 36.

Heavy duty straps 42 are secured as by stitching 43 to the outer inner stretchable strip 38 forming the side of tourniquet 36, and are provided at intermediate portions with tabs 44 which carry hook-shaped buckles 45.

The ends of straps 42 are reverted and stitched to form pointed tabs as at 46, and extend beyond the end stitching 47, as well as the end of the sleeve 36. Conventional adjusting buckles 48 are also provided and may be suitably positioned at any place along the free ends 49 of straps 42 to provide for size adjustment. The buckles 48 are provided with slots 50 which engage the corresponding hooks of buckles 45. Tie straps 51 are suitably secured along one end of sleeve 36, and are adapted for further securing the tourniquet when in awkward positions.

It is to be noted that the plastic sheet 41a is provided with an opening 41b which is aligned, when strip 41a is positioned in sleeve 36 with slot 52, through which the connector 27 extends, the latter also extending through the slot 52 for ready connection to the tip 26a of flexible hose 26.

In the use and operation of the device the tourniquet is applied in the conventional manner the buckles 48 having been initially adjusted, or subsequently after application, and then hooked over the hooks 45. Inflation to the desired pressure is then achieved by regulation of the control 31 through the hose 26, and such pressure is retained for as long as may be necessary.

The positive locking adjustable hooks retain the tourniquet securely in position for as long as may be desired, and the regulating member 31 may be varied for manual or automatic control of the pressure within the tourniquet.

From the foregoing it will now be seen that there is herein provided an improved tourniquet which accomplishes all of the objects of this invention and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A pneumatic tourniquet including an elongated inner elastic strip of fabric adapted to encircle the limb of a patient, a substantially co-extensive outer strip of non-elastic fabric secured along its edges and ends to said first mentioned strip while said elastic strip is under tension and having a longitudinally extending slot along a portion of its length, an inelastic strap secured to said outer strip, quick release fastening means carried by said strap for securing the same about the limb of a patient, an inner flexible inflatable bladder insertible through said slot into said sleeve, a pair of semi-flexible reinforcing sheets, one positioned on each side of said bladder in said sleeve, and means for introducing gaseous fluid under pressure into said bladder, whereby when said tourniquet is tightened about a limb said strip may expand or contract as required without change in shape thus avoiding wrinkling of said inner elastic strip.

2. A pneumatic tourniquet including an elongated inner elastic strip of fabric adapted to encircle the limb of a patient, a substantially co-extensive outer strip of non-elastic fabric secured along its edges and ends to said first mentioned strip while said elastic strip is under tension and having a longitudinally extending slot along a portion of its length, an inelastic strap secured to said outer strip, quick release fastening means carried by said strap for securing the same about the limb of a patient, an inner flexible inflatable bladder insertible through said slot into said sleeve, a pair of semi-flexible reinforcing sheets, one positioned on each side of said bladder in said sleeve, means for introducing gaseous fluid under pressure into said bladder, whereby when said tourniquet is tightened about a limb said strip may expand or contract as required without change in shape thus avoiding wrinkling of said inner elastic strip, said last mentioned means including a connector sealed to said bladder and extending outwardly through said sleeve, and transverse tie straps secured to one end of said sleeve.

3. A pneumatic tourniquet including an elongated inner elastic strip of fabric adapted to encircle the limb of a patient, a substantially co-extensive outer strip of non-elastic fabric secured along its edges and ends to said first mentioned strip while said elastic strip is under tension and having a longitudinally extending slot along a portion of its length, an inelastic strap secured to said outer strip, quick release fastening means carried by said strap for securing the same about the limb of a patient, an inner flexible inflatable bladder insertible through said slot into said sleeve, a pair of semi-flexible reinforcing sheets, one positioned on each side of said bladder in said sleeve, and means for introducing gaseous fluid under pressure into said bladder, whereby when said tourniquet is tightened about a limb said strip may expand or contract as required without change in shape thus avoiding wrinkling of said inner elastic strip, said last mentioned means including a connector sealed to said bladder and extending outwardly through said sleeve, one of said sheets having an opening therein for the reception of said connector, said sheets extending substantially the full length of said bladder and sleeve.

4. A pneumatic tourniquet including an elongated inner elastic strip of fabric adapted to encircle the limb of a patient, a substantially co-extensive outer strip of non-elastic fabric secured along its edges and ends to said first mentioned strip while said elastic strip is under tension and having a longitudinally extending slot along a portion of its length, an inelastic strap secured to said outer strip, quick release fastening means carried by said strap for securing the same about the limb of a patient, an inner flexible inflatable bladder insertible through said slot into said sleeve, a pair of semi-flexible reinforcing sheets, one positioned on each side of said bladder in said sleeve, and means for introducing gaseous fluid under pressure into said bladder whereby when said tourniquet is tightened about a limb said strip may expand or contract as required without change in shape thus avoiding wrinkling of said inner elastic strip, said last mentioned means including a connector sealed to said bladder and extending outwardly through said sleeve, one of said sheets having an opening therein for the reception of said connector, said sheets extending substantially the full length of said bladder and sleeve, the ends of said elastic strip being reverted and extending over the ends of said inelastic strip and secured thereto forming end pockets for the retention of said bladder and strips.

5. A pneumatic tourniquet including an elongated inner elastic strip of fabric adapted to encircle the limb of a patient, a substantially co-extensive outer strip of non-elastic fabric secured along its edges and ends to said first mentioned strip while said elastic strip is under tension and having a longitudinally extending lot along a portion of its length, an inelastic strap secured to said outer strip, quick release fastening means carried by said strap for securing the same about the limb of a patient, an inner flexible inflatable bladder insertible through said slot into said sleeve, a pair of semi-flexible reinforcing sheets, one positioned on each side of said bladder in said sleeve, and means for introducing gaseous fluid under pressure into said bladder, whereby when said tourniquet is tightened about a limb said strip may expand or contract as required without change in shape thus avoiding wrinkling of said inner elastic strip, said last mentioned means including a connector sealed to said bladder and extending outwardly through said sleeve, one of said sheets having an opening therein for the reception of said connector, said sheets extending substantially the full length of said bladder and sleeve, the ends of said elastic strip being reverted and extending over the ends of said inelastic strip and secured thereto forming end pockets for the retention of said bladder and sheets, said sheets being comprised of relatively thick flat bendable plastic.

6. A pneumatic tourniquet including an elongated inner elastic strip of fabric adapted to encircle the limb of a patient, a substantially co-extensive outer strip of non-elastic fabric secured along its edges and ends to said first mentioned strip while said elastic strip is under tension and having a longitudinally extending slot a portion of its length, an inelastic strap secured to said outer strip, quick release fastening means carried by said strap for securing the same about the limb of a patient, an inner flexible inflatable bladder insertible through said slot into said sleeve, a pair of semi-flexible reinforcing sheets, one positioned on each side of said bladder in said sleeve, means for introducing gaseous fluid under pressure into said bladder, whereby when said tourniquet is tightened about a limb said strip may expand or contract as required without change in shape thus avoiding wrinkling of said inner elastic strip, said last mentioned means including a connector sealed to said bladder and extending outwardly through said sleeve, one of said sheets having an opening therein for the reception of said connector, said sheets extending substantially the full length of said bladder and sleeve, said slot being positioned adjacent one end of said sleeve, and a strip forming a pocket on the outside of the distal end of said bladder adapted for the reception of a stiff element to facilitate insertion of said bladder through said slot into said sleeve.

7. A pneumatic tourniquet including an elongated inner elastic strip of fabric adapted to encircle the limb of a patient, a substantially co-extensive outer strip of non-elastic fabric secured along its edges and ends to said first mentioned strip while said elastic strip is under tension and having a longitudinally extending slot along a portion of its length, an inelastic strap secured to said outer strip, quick release fastening means carried by said strap for securing the same about the limb of a patient, an inner flexible inflatable bladder insertible through said slot into said sleeve, a pair of semi-flexible reinforcing sheets, one positioned on each side of said bladder in said sleeve, means for introducing gaseous fluid under pressure into said bladder, whereby when said tourniquet is tightened about a limb said strip may expand or contract as required without change in shape thus avoiding wrinkling of said inner elastic strip, said last mentioned means including a connector sealed to said bladder and extending outwardly through said sleeve, one of said sheets having an opening therein for the reception of said connector, said sheets extending substantially the full length of said bladder and sleeve, said slot being positioned adjacent one end of said sleeve, and a strip forming a pocket on the outside of the distal end of said bladder adapted for the reception of a stiff element to facilitate insertion of said bladder through said slot into said sleeve, said pocket being on the side of said bladder opposite said connector.

References Cited in the file of this patent
UNITED STATES PATENTS

| | | |
|---|---|---|
| 1,089,122 | Faught et al. | Mar. 3, 1914 |
| 1,366,121 | Dorsey | Jan. 18, 1921 |
| 2,235,030 | Mason et al. | Mar. 18, 1941 |
| 2,347,197 | Liberte | Apr. 25, 1944 |
| 2,444,161 | Hanafin | June 29, 1948 |
| 2,582,123 | Heitz | Jan. 8, 1952 |
| 2,678,040 | Poole et al. | May 11, 1954 |